United States Patent
Adam et al.

(10) Patent No.: US 11,498,401 B2
(45) Date of Patent: Nov. 15, 2022

(54) VEHICLE ROOF AND ROOF ASSEMBLY

(71) Applicant: Webasto SE, Stockdorf (DE)

(72) Inventors: Michael Adam, Stockdorf (DE);
Matthias Frank, Stockdorf (DE);
Stefan Schäufler, Stockdorf (DE); Nico Austermann, Datteln (DE)

(73) Assignee: WEBASTO SE, Stockdorf (DE)

( * ) Notice: Subject to any disclaimer, the term of this patent is extended or adjusted under 35 U.S.C. 154(b) by 253 days.

(21) Appl. No.: 16/986,344

(22) Filed: Aug. 6, 2020

(65) Prior Publication Data

US 2021/0078394 A1 Mar. 18, 2021

(30) Foreign Application Priority Data

Sep. 16, 2019 (DE) .......................... 102019124844.2

(51) Int. Cl.
*B60J 10/25* (2016.01)
*B60J 10/246* (2016.01)
(Continued)

(52) U.S. Cl.
CPC ............. *B60J 10/25* (2016.02); *B60J 10/246* (2016.02); *B60J 10/90* (2016.02); *B60J 7/043* (2013.01); *B60J 7/053* (2013.01)

(58) Field of Classification Search
CPC . B60J 10/25; B60J 10/246; B60J 10/90; B60J 10/00; B60J 10/82; B60J 7/043; B60J 7/053
(Continued)

(56) References Cited

U.S. PATENT DOCUMENTS 5,366,267 A * 11/1994 Nozaki ................... B60J 10/82
49/482.1
7,651,159 B2 * 1/2010 Radmanic ............... B60J 10/25
296/213
(Continued)

FOREIGN PATENT DOCUMENTS

DE 10336193 A1 3/2005
DE 102016112579 B3 * 8/2017 ............ B60J 10/248
(Continued)

OTHER PUBLICATIONS

Sommer, "Strand-shaped Sealing Profile and Roof Arrangement", Aug. 17, 2017, German Patent Office, Edition: DE102016112579B3 (Year: 2017).*
(Continued)

Primary Examiner — Dennis H Pedder
Assistant Examiner — Joyce Eileen Hill
(74) Attorney, Agent, or Firm — Fitch, Even, Tabin & Flannery, LLP

(57) ABSTRACT

A vehicle roof for a motor vehicle having a roof opening which is defined by a peripheral vehicle roof edge, a moveable roof element for either closing or at least partially exposing the roof opening, which is held on the vehicle roof, and a continuous profiled seal fixed to the vehicle roof along the vehicle roof edge, wherein the continuous profiled seal comprises a first tubular seal, wherein the first tubular seal is designed to seal the vehicle roof in relation to the moveable roof element, the first tubular seal has a drainage lip, which extends downwards in a vertical direction (Z) from the first tubular seal.

10 Claims, 3 Drawing Sheets

Figure 1:
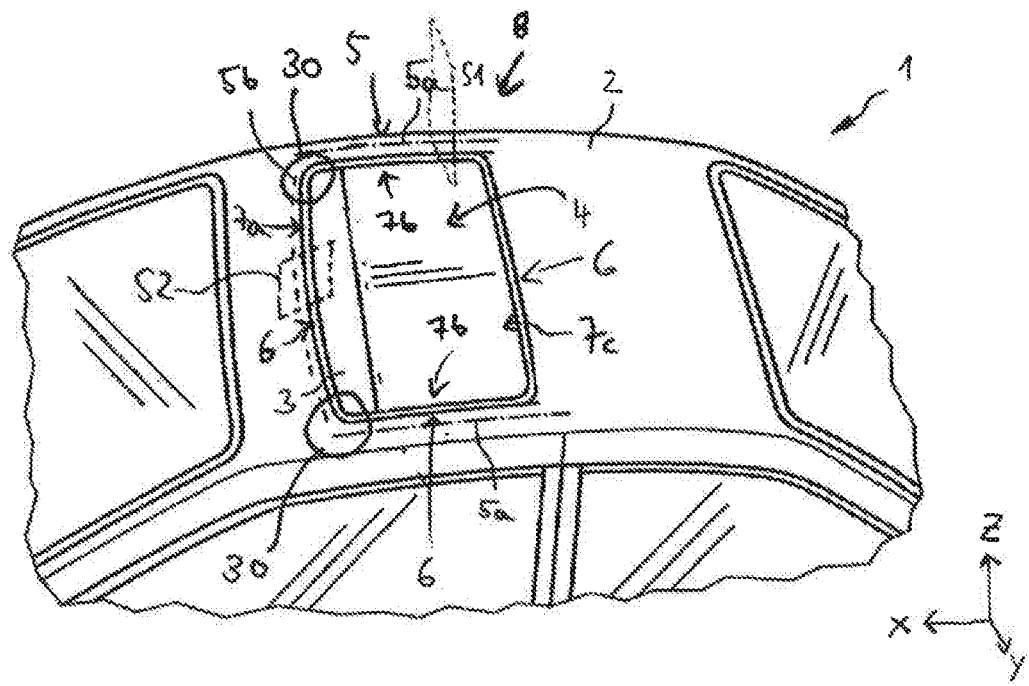

(51) Int. Cl.
  *B60J 10/90* (2016.01)
  *B60J 7/043* (2006.01)
  *B60J 7/053* (2006.01)

(58) Field of Classification Search
  USPC .... 296/216.06, 216.07, 216.08, 216.09, 222;
  49/498.1, 489.1, 476.1, 480.1
  See application file for complete search history.

(56) References Cited

U.S. PATENT DOCUMENTS

| | | | |
|---|---|---|---|
| 2008/0217964 A1* | 9/2008 | Katayama | B60J 10/24 296/213 |
| 2017/0050500 A1* | 2/2017 | Uchida | B60J 7/043 |
| 2019/0275871 A1 | 9/2019 | Schaufler et al. | |

FOREIGN PATENT DOCUMENTS

| | | | |
|---|---|---|---|
| DE | 102017116940 A1 | 1/2019 | |
| DE | 10 2018 105 069.0 B3 | 8/2019 | |
| EP | 0396006 A1 | 11/1990 | |
| JP | 2564673 Y2 * | 3/1998 | ............ B60J 10/10 |
| JP | 2011207325 A * | 10/2011 | ............ B60J 10/10 |

OTHER PUBLICATIONS

Takai, "A Seal Section of an Open Roof Drain", Mar. 9, 1998, Publisher: Japanese Patent Office, Edition: JP2564673Y2 (Year: 1998).*

Hideaki, "Weather Strip and Method for Manufacturing the Same", Oct. 20, 2011, Publisher: Japanese Patent Office, Edition: JP2011207325A (Year: 2011).*

* cited by examiner

VEHICLE ROOF AND ROOF ASSEMBLY

CROSS-REFERENCE TO RELATED APPLICATIONS

This application claims priority from German Patent Application Number DE 10 2019 124 844.2, filed Sep. 16, 2019, which is hereby incorporated herein by reference in its entirety for all purposes.

FIELD

The invention relates to a vehicle roof. The invention further relates to a roof assembly for a vehicle roof.

BACKGROUND

A vehicle roof of a motor vehicle may have a roof opening, which is closed by a moveable roof element and optionally at least partially exposed. To seal the vehicle roof with the moveable roof element a seal (also referred to as a roof aperture seal), for example, is provided. This seal is intended to prevent penetrating water getting into a dry area of the vehicle roof or the motor vehicle.

It is desirable to specify a concept for a seal of the generic type which allows reliable sealing.

SUMMARY

According to one aspect a vehicle roof for a motor vehicle is disclosed. The vehicle roof has a roof opening which is defined by a peripheral vehicle roof edge. A moveable roof element, for example a cover or sunroof cover, is provided for either closing or at least partially exposing the roof opening. The moveable roof element is held on the vehicle roof. A continuous profiled seal is provided fixed to the vehicle roof along the vehicle roof edge. The continuous profiled seal comprises a first tubular seal, which is designed to seal the vehicle roof in relation to the moveable roof element. The first tubular seal has a drainage lip. The drainage lip extends downwards in a vertical direction from the first tubular seal. The drainage lip has a cut-out in a predefined area of the profiled seal, so that the drainage lip is interrupted in a main direction of extent of the profiled seal along the vehicle roof edge.

In an operative, fitted state the continuous profiled seal is fixed to the vehicle roof and in a closed state, in which the roof element closes the roof opening, seals off the transition between the moveable roof element and the vehicle roof. Water that nevertheless gets in between the profiled seal and the roof element is led into a water guide channel of the frame. The first drainage lip is provided in order that as much penetrating water as possible can be ducted in this water guide channel and drained off in a controlled manner without getting into a dry area of the vehicle or the roof assembly. This lip "hangs" down from the first tubular seal as a sort of curtain.

It has emerged that in particular inclined positions of a motor vehicle (for example 15° v/15° s) water is able flow forwards along the drainage lip, so that in an area where the drainage lip is folded over in the direction of the first tubular seal water can get into the dry area.

The cut-out interrupts the drainage lip, that is to say its course in the main direction of extent of the profiled seal (also referred to as seal, sealing element or roof aperture seal). This means that, given a corresponding inclination of the vehicle, penetrating water which adheres to the drainage lip is not able to run beyond the cut-out along the lip. In other words, the cut-out is designed so that water can be purposely drained of at the cut-out.

Here and in the following, specified locations or directions, such as "front" or "rear" relate to a vehicle longitudinal axis and a usual direction of travel of an operational motor vehicle. The vehicle longitudinal axis may also be referred to as the horizontal axis or X-axis in the associated X-direction (see systems of coordinates entered in the figures). Indications used such as "top" and "bottom" relate to the Z-direction in an operational state of the vehicle.

The cut-out is a recess of the drainage lip. The cut-out divides the drainage lip into two portions, for example. In other words, the first portion of the drainage lip terminates at the cut-out and the second portion of the drainage lip commences after the cut-out and continues the course of the drainage lip. Again, in other words the drainage lip has a first rear end and a second front end at the cut-out.

The first drainage lip is designed so that it runs from the first tubular seal, for example, to below a first web of a guide rail channel of a roof frame. The drainage lip forms a type of "water curtain". By virtue of its elongated design, the drainage lip in conjunction with the cut-out screens penetrating water away from the dry area in largely all functional positions of the roof (vehicle horizontal and/or in inclined position). The seal described moreover allows the seal to fulfil the desired functions in a wide range of tolerance positions. The profiled seal described furthermore affords the advantages that penetrating water or drops of water as a rule drain off via the drainage lip directly at the point of penetration and normally are neither led parallel along the drainage lip nor able to creep around this and reach areas where water is undesirable. Should water nevertheless run parallel along the lip, the cut-out is at least provided, which prevents a further parallel conduction of the water.

A further advantage is that the profiled seal is suitable for a number of roof assemblies with moveable roof elements. Roof assemblies differ from one another, for example, in the actual configurations of the roof skin, the sunroof etc. Furthermore, differences in curvature between the roof skin and the guide rail, possibly due to slight adjustments in transferring technically identical sub-assemblies from one vehicle model range to another, as often happens with panorama sunroofs, for example, lead to different installation and thereby tolerance conditions. This leads to the differing distances between the roof skin and frame elements, which are compensated for by the profiled seal described.

The drainage lip represents an element protruding or projecting out from the tubular seal, which is designed to allow a drop, in particular a water drop, adhering thereto to drain or run off from the profiled seal in a defined manner. For example, it may be an element with an at least partially wedge-shaped cross section or a tapering element. The drainage lip optionally has a separation edge, drainage tip or the like. The drainage lip, particularly in an unstressed state, in which it is not in contact with other components, is arranged between the moveable cover element and a roof frame.

The profiled seal may also be referred to as a roof aperture seal for a vehicle. It may be a one-piece profiled seal, for example. The profiled seal is produced by a process of extrusion, for example, and has a constant cross section. The profiled seal is preferably produced in one piece or one part. A tubular seal is taken to mean a profiled portion of the profiled seal which forms a cavity. A tubular seal in this case need not necessarily be circular, but may also have other, duct-like or tubular shapes. The tubular seal may also be referred to as a hollow chamber or primary hollow chamber. The profiled seal, for example, comprises two or more different materials. For example, sealing portions of the tubular seals at least are produced from foamed and/or soft rubber, rubber-like or similar material, whilst other portions of the profiled seal are produced from harder material, in particular rubber-like or rubber material. The sealing portions represent areas of the tubular seals which face the surfaces or elements to be sealed and which at least in an operative state are in contact with these. A resilient action of the tubular seals is thereby achieved, for example. Examples of materials are EPDM, foam rubber, NBR or silicone rubber.

According to one embodiment the vehicle roof edge comprises at least one longitudinal edge portion running in a vehicle longitudinal direction and one front edge portion running transversely to the vehicle longitudinal direction. The profiled seal is arranged along the longitudinal edge portion and the front edge portion. The profiled seal has a curvilinear course in a transitional area between the longitudinal edge portion and the front edge portion, the cut-out being formed in the transitional area. In other words, the profiled seal comprises a first portion, which runs in a straight line along the longitudinal edge portion, a second portion that runs in a curved line in the transitional area, and a third portion which runs in a straight line along the front edge portion. The cut-out is in the curvilinear second portion of the seal. The second portion is, in particular, a front corner area of the roof opening, that is to say when operating correctly the area faces the vehicle front end.

The solution described proves especially advantageous precisely for the transitional area mentioned since, given a corresponding inclination of the vehicle (see example above), penetrating water which adheres to the drainage lip in the longitudinal edge area can get beyond the transitional area to the portion of the seal which is assigned to the front edge area. Depending on the degree of undercut of the cover, this can lead to the aforementioned problem which is prevented by the solution described.

According to one embodiment the cut-out is so formed—in relation to the main direction of extent of the profiled seal—that the drainage lip at a rear end area of the cut-out projects further forwards on a side remote from the first tubular seal than on a side facing the first tubular seal. In other words, the drainage lip projects in the direction of the front end area of the cut-out. The drainage lip accordingly has a free end, which points in the direction of the front end area. For example, owing to the cut-out a distance from the first tubular seal to the drainage lip increase forwards in the main direction of extent. For example, a vertical end edge of the drainage lip at the rear end area runs away obliquely downwards from the first tubular seal. The cut-out is designed, for example, so that the drainage lip at the rear end area is of triangular formation. At the rear end area, the cut-out consequently does not run perpendicular to the main direction of extent, but obliquely, say at an acute angle, to the main direction of extent. This makes a particular contribution in allowing water to drain off in a defined manner at the rear end area via the drainage lip, in particular the free end.

According to one embodiment the cut-out—in relation to the main direction of extent of the profiled seal—is formed longer on the side facing the first tubular seal than on the side remote from the first tubular seal.

According to one embodiment the drainage lip in the rear end area of the cut-out tapers towards the side remote from the tubular seal, again in relation to the main direction of extent of the profiled seal.

According to one embodiment the drainage lip tapers to a point in the rear end area of the cut-out. In the rear end area, the drainage lip accordingly has a tip on the side remote from the first tubular seal.

The embodiments described above moreover contribute to a targeted draining off of water in the predefined area of the profiled seal along the vehicle edge.

According to one embodiment the vehicle roof comprises a roof frame, which holds (or supports) the roof element and which is arranged along the vehicle roof edge of the roof opening. The roof frame comprises a longitudinal frame element, which comprises a top web of a guide rail channel, along the longitudinal edge portion. The drainage lip extends along the longitudinal edge portion past the top web (at a predefined distance) to below the top web. The roof frame may also be referred to as the frame. The roof frame also comprises a transverse roof element, for example, along the front edge portion.

The extent of the drainage lip to below the top web does not necessarily mean that the drainage lip has to terminate directly below the top web. Rather it includes the possibility of the drainage lip reaching to below a horizontal plane defined by an underside of the top web. In other words, the drainage lip and the top web, if these were projected into a common horizontal plane, need not overlap. Extending to below the top web means, for example, that a free end, for instance a tip, of the drainage lip is arranged below the top web. The drainage lip is preferably of elongated, salient design. The web, for example, is a horizontal rib of a guide rail for the roof element or its mechanism or a roller blind mechanism.

The result, particularly in an unbent state of the drainage lip (no interaction with a cover undercut, for example) is that the top (guide rail) web is overhung by the long drainage lip, and that penetrating water would have to flow upwards against the force of gravity in order to get over the top web into a dry area of the roof assembly or a vehicle. The overhang of the drainage lip also makes it more difficult for water to adhere to an underside of the upper guide rail web, so that the water is prevented from running further into a drive cable channel of the roof element or the guide rail. The fact that water is no longer able to reach the top web and is screened by the drainage lip means that the use of butyl and the use of an additional component such as a so-called water shoot can be avoided. Since only one drainage lip is provided, the penetrating water cannot adhere to an edge or another element arranged close to the first lip. Larger accumulations of water, which can lead, for example, to an unforeseeable drainage behaviour, are avoided.

According to one embodiment the continuous profiled seal comprises a second tubular seal, which is connected to the first tubular seal, the second tubular seal being designed to seal the frame in relation to the vehicle roof. For example, the second tubular seal is arranged on the frame in the operative, fitted state.

The two tubular seals are joined by a connecting web, for example. The connecting web, for example, has a stiffer and/or harder material compared to the sealing portions of the tubular seals. The connecting web is not necessarily composed of the same material as the tubular seals. The connecting web may also be part of one or both tubular seals. The profiled seal is typically fitted to the roof skin of a vehicle defining the roof opening, the second tubular seal being arranged between the roof skin and the frame element. In particular, the second tubular seal is compressed and thus forms a seal in relation to the frame element. The second tubular seal is designed to seal the frame in relation to the vehicle roof, primarily to counter noise emissions and dust, but also to prevent water reaching the dry area.

Like the first tubular seal the second tubular seal may also be referred to as a second hollow chamber or secondary hollow chamber. The drainage lip on the first tubular seal helps to ensure that little water, if any, is able to reach the second tubular seal, which is arranged on the frame. The drainage lip is kinematically isolated from the second tubular seal, so that the position of the drainage lip is reproducible in any installed situation and therefore makes a considerable contribution to the robustness of the roof system as a whole. In particular, it screens off the top guide rail web in any installed and toleranced position and therefore reliably shields the dry area. A further advantage is that a risk of obstruction when installing or assembling the profiled seal with other components can be excluded. In particular, the transitional area to the second tubular seal and the second tubular seal itself can correspondingly be elastically formed, so that a reliable assembly is ensured in any toleranced positions.

Alternatively, the second tubular seal may also be part of a further profiled seal, which is formed separately from the first profiled seal previously described. The first profiled seal and the second profiled seal are therefore independent components, which can be fitted independently of one another. This allows a separate assembly and manufacture. Such decoupling allows reliable sealing in relation to the frame, regardless of any curvature of the frame and any curvature of the vehicle roof. In particular, the frame and the vehicle roof may be differently curved, so that a distance between the frame and the vehicle roof varies, at least in portions.

According to a further aspect a roof assembly for a vehicle roof of a motor vehicle having a roof opening is disclosed. The roof assembly is designed as a sub-assembly for a vehicle roof and can be marketed independently. The assembly comprises a moveable roof element for either closing or at least partially exposing the roof opening, which can be arranged on, that is to say held or fitted to the vehicle roof. The assembly comprises a continuous profiled seal that can be fixed to the vehicle roof along the vehicle roof edge. The continuous profiled seal comprises a first tubular seal, the first tubular seal being designed to seal the vehicle roof in relation to the moveable roof element. The first tubular seal has a drainage lip, which extends downwards in a vertical direction from the tubular seal. The drainage lip has a cut-out in a predefined area of the profiled seal, so that the drainage lip is interrupted in a main direction of extent of the profiled seal along the vehicle roof edge.

This substantially affords the advantages and functions referred to previously. The observations made with regard to the first aspect concerning the features and developments described similarly apply by analogy.

Further advantages and functions are disclosed in the following detailed description of an exemplary embodiment. The exemplary embodiment is described below with the aid of the figures attached. Similar elements or ones exercising essentially similar effects are provided with the same reference numerals in all figures.

BRIEF DESCRIPTIONS OF THE DRAWINGS

Figure 2:
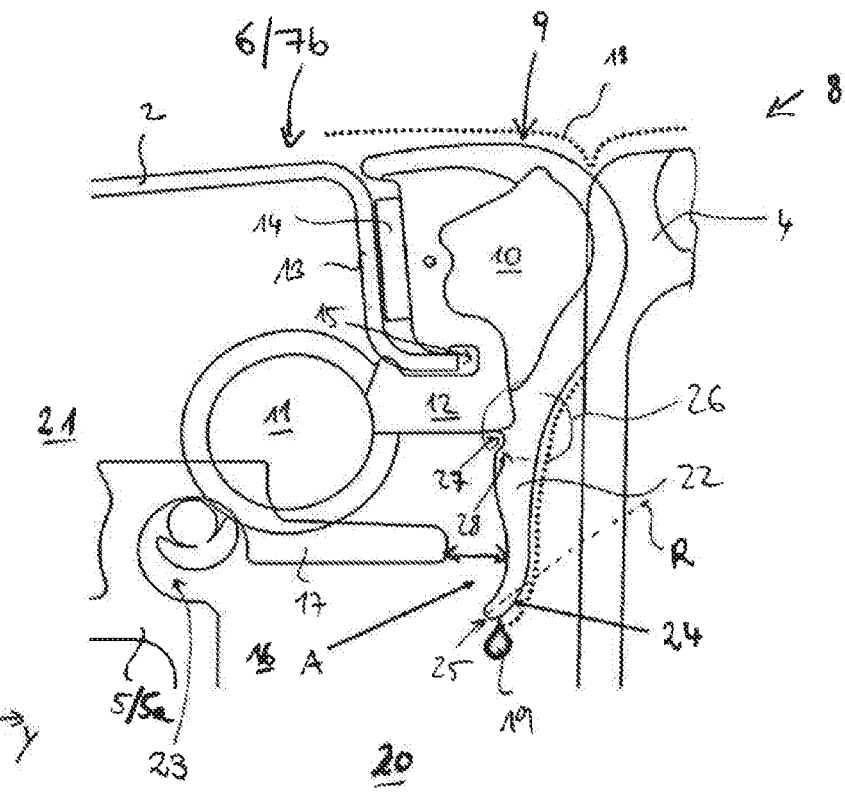
Figure 3:
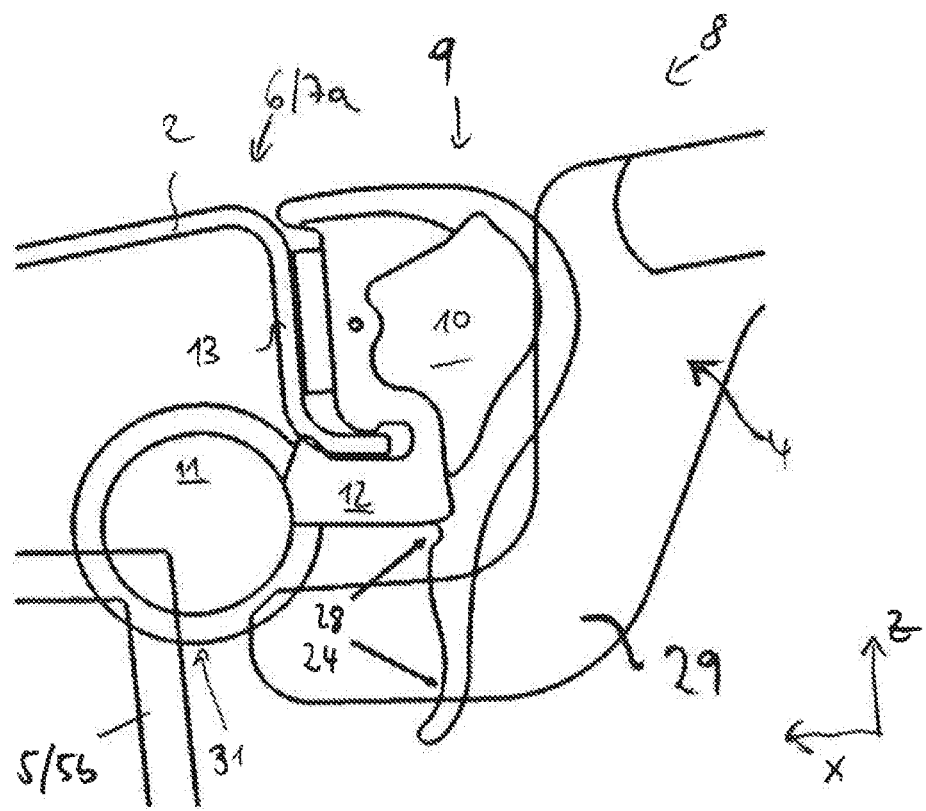
Figure 4:
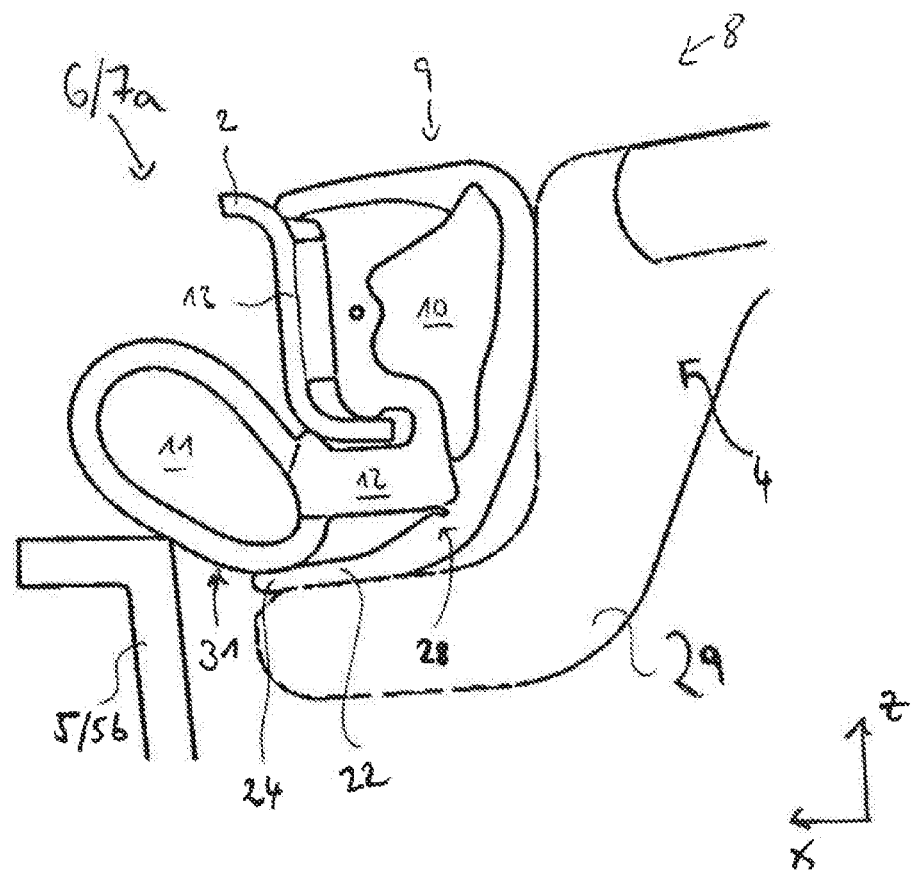
Figure 5:
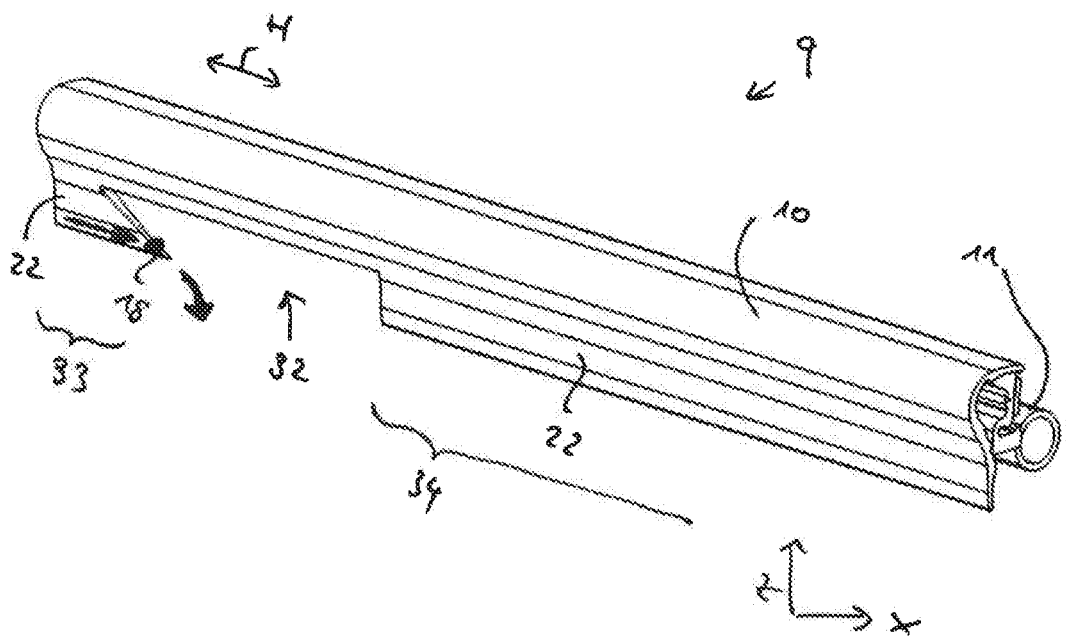
Figure 6:
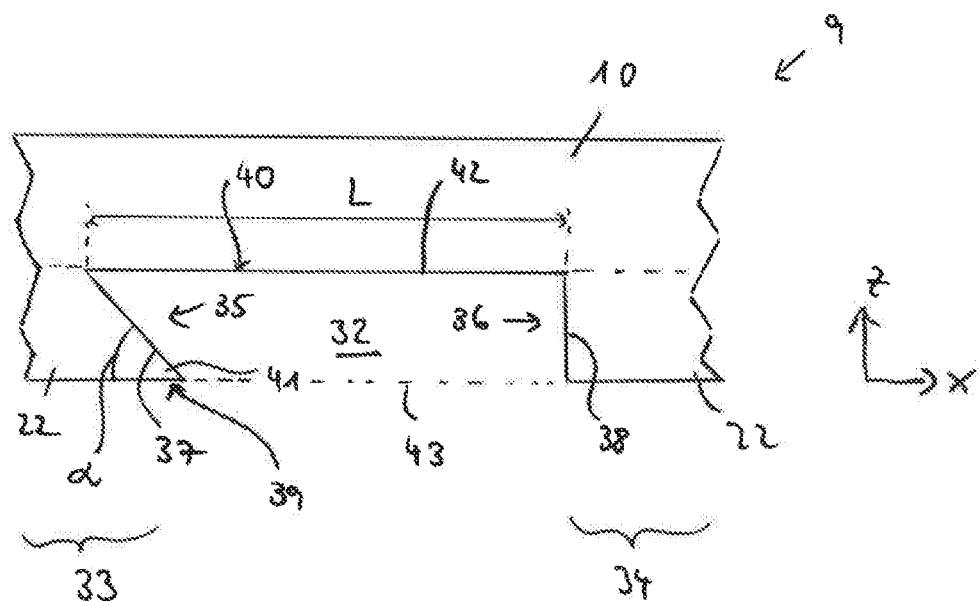

In the figures:
FIG. 1 shows a schematic view of a vehicle and
FIGS. 2 to 4 show schematic cross-sectional views of a vehicle roof with a profiled seal in various installed situations and
FIGS. 5 and 6 show two schematic views of the profiled seal.

DETAILED DESCRIPTION

FIG. 1 schematically shows a vehicle 1 having a vehicle roof 2. The vehicle roof 2 is, in particular, the fixed roof of a vehicle, also known as the roof skin. The vehicle roof 2 encloses a roof opening 3. The roof opening 3 can be either closed or at least partially exposed by means of a moveable roof element 4 displaceable along a vehicle longitudinal axis (X-direction, see system of coordinates). The moveable roof element 4, also referred to as the cover, is held by a (roof) frame 5.

The roof opening 3 is defined, in particular, by a peripheral vehicle roof edge 6. The vehicle roof edge 6 comprises a front edge portion 7a and an opposing rear edge portion 7c, which each run transversely to vehicle longitudinal axis. The two front and rear edge portions 7a, 7c each open into opposing longitudinal edge portions 7b, which run in the vehicle longitudinal direction.

Along the longitudinal edge portions 7b the frame 5 has longitudinal frame elements 5a with guide rails, which are fixed to the vehicle roof 2 on both sides of the roof opening 3. Furthermore, a transverse frame element 5b (the rear one is not shown in FIG. 1) is provided along each—front and rear—edge portion 7a, 7c.

The frame 5 serves, in particular, to guide the movement of the roof element 4 and to hold other elements, such as drive motors and/or drive cables. The roof element 4 and the frame 5 are in particular part of a roof assembly 8, which can be used as an independent sub-assembly with the vehicle roof 2.

FIG. 2 shows a schematic sectional view of the vehicle 1 along an exemplary plane of section S1 (FIG. 1). In addition to the moveable roof element 4 and the frame 5, the roof assembly 8 comprises a continuous profiled seal 9. The profiled seal 9 is formed by a first tubular seal 10 and a second tubular seal 11, which are joined to one another by a connecting web 12. The profiled seal 9 is elastically deformable, resilient. The profiled seal 9 extends in a main direction of extent H along the vehicle roof edge 6 of the roof opening 3, that is in the X-direction or Y-direction, for example, or curvilinearly in the transition from the longitudinal edge portions 7b to the front edge portion 7a. The profiled seal 9 runs in a straight line along the longitudinal edge portions and the front and rear edge portions 7a, b, c. In the main direction of extent, the profiled seal 9 is in each case formed significantly longer than in either of the two other directions perpendicular to the main direction of extent H. The main direction of extent H corresponds to a course of the profiled seal 9.

In the longitudinal edge portion 7b the vehicle roof 2 comprises stamped portion 13, to which the profiled seal 9 is fixed by an adhesively bonded connection 14 and a positively interlocking fit by means of a recess 15 on the vehicle roof 2. Other fixing methods are likewise feasible.

The frame 5 (longitudinal frame element 5a) comprises a guide rail 16, a top web 17 being provided, which may also be referred to as a guide rail web or web of a guide rail channel.

FIG. 2 shows the profiled seal 9 in its original extent before it is actually in the operative, in particular compressed and braced state. The first and second tubular seal 11 therefore overlap with the roof element 4 and the frame 5. The first tubular seal 10 is designed to form a seal in relation to the moveable roof element 4 and the vehicle roof 2. The second tubular seal 11 is designed to form a seal between the vehicle roof 2 and the frame 5, in particular the top web 17. According to FIG. 2 the first tubular seal 10 is arranged in a Y-direction between the vehicle roof 2 and the moveable roof element 4. According to FIG. 2 the second tubular seal 11 is arranged in a Z-direction between the frame 5 and the vehicle roof 2. In the operative, compressed and fitted state the tubular seals 10 and 11 of the profiled seal 9 serve to prevent the ingress of water, dust and/or sound.

With the vehicle roof 2 closed, that is to say when the moveable roof element 4 is located fully in the roof opening 3, the first tubular seal 10 forms a maximum seal between the vehicle roof 2 and the roof element 4. Nevertheless, water 18 (dotted line) may penetrate towards the vehicle interior counter to the Z-direction. This water 18 is manageably led by draining it (see water drop 19) into a wet area 20 by means of a drainage lip 22 arranged on the first tubular seal 10, and from there is purposely drained off via a water guide channel (not shown). Water 18 is therefore prevented, at least to a very large extent, from getting into a dry area 21 or a drive cable channel 23 of the frame 5.

The profiled seal 9 is produced from rubber or rubber-like materials. The profiled seal 9, for example, has one or more unfoamed, firmer and stiffer constituent profiles and one or more foamed constituent profiles, which are lighter and softer. Solid rubber, for example, is used for the firmer material, whilst foam rubber is used for the softer, more elastic material. The solid rubber is unfoamed or hard rubber, for example. Other material combinations are also feasible, however.

In an operative, fitted state (in which, in particular, the tubular seals 10 and 11 are or can be compressed, depending on the bearing contact of the roof element 4) the first tubular seal 10 is arranged above the top web 17. Furthermore, the elongated drainage lip 22, which extends from the first tubular seal 10, is designed so that this basically extends in a vertical direction (Z-direction) to a level below the top web 17. Here, however, the drainage lip 22 is located at a distance (distance A) from the top web 17 of the longitudinal frame element 5a and does not form a contact surface or contact face with this. Furthermore, the drainage lip 22 has a slightly arched or curvilinear course. In particular, a free end 24 of the drainage lip 22, which is located below the top web 17, is curved or arched in such a way that the free end area 24, in particular a tip 25 of the drainage lip 22, points in a direction away from the moveable roof element 4. In other words, the free end area 24 is oriented at an acute angle of at least 15°, preferably at least 20°, to the vertical direction (Z-direction), in relation to a main direction of extent R of the free end area 24.

A seamless transition is furthermore formed between the first tubular seal 10 and the drainage lip 22, so that the drainage lip and the first tubular seal 10 have a constant contour profile at least on the side facing the moveable roof element 4.

The formation of the drainage lip 22 described ensures that penetrating water 18 can be drained away as rapidly as possible in the direction of gravitational force into the wet area 20.

The drainage lip 22, in a coupling area 26 in which the drainage lip 22 is joined to the first tubular seal 10, furthermore has a notch 27 as part of a folding hinge 28. The notch 27 and the folding hinge 28 are so arranged and formed that, on contact from below by another element, the drainage lip 22 is able to fold in a predefined direction towards the frame or the second tubular seal 11 in a predetermined and desired manner.

The defined folding-up described is advantageous particularly for a so-called cover undercut 29, which is arranged on the moveable roof element 4 on the side facing the front edge area 7a. This is shown by way of example in the sectional views in FIGS. 3 and 4 along a further exemplary plane of section S2 (see FIG. 1), FIG. 3 showing the actual extent of the profiled seal 9 and therefore the overlap with the other components, whilst FIG. 4 shows an actual compressed state. It should be pointed out that not all reference numerals in FIG. 2 are also included in the other FIGS. 3 to 5.

In closing the roof opening 3 the roof element 4 closes in such a way that the cover undercut 29 is moved from below under the vehicle roof 2 in the area of the vehicle roof edge 6, in particular the stamped portion 13. In the closed state the cover undercut 29 presses from below against the profiled seal 9. In so doing the drainage lip 22 is bent over in a predefined manner by means of the folding hinge 28 (see FIG. 4). In this state the free end area 24 of the drainage lip 22 points markedly in the direction of the frame 5. The frame 5 does not comprise any guide rail for a mechanism of the moveable roof element 4 along the front edge portion 7a and along the rear edge portion 7c. The transverse frame elements 5b are therefore formed differently from the longitudinal frame elements 5a. Besides the folding hinge 28, the curved formation of the drainage lip 22, as described above, also helps in achieving this defined folded state as shown in FIG. 4.

As can be seen in particular from FIG. 4, the drainage lip 22 can come into contact with the second tubular seal 11, in particular on an underside. In extreme inclined positions of the vehicle 1, water which adheres to the drainage lip 22 in the area of a longitudinal edge portion 7b as shown in FIG. 2 could migrate forwards in the X-direction. In transitional areas 30 between a longitudinal edge portion 7b and the front edge portion 7a (see FIG. 1), in which the profiled seal 9 runs curvilinearly, that is to say bent or bowed, the water is thus able to reach the drainage lip 22 along the front edge portion 7a. In so doing the water may migrate over the bent drainage lip 22 to the second tubular seal 11 and from there get into the dry area.

The profiled seal 9 is specially designed in order to prevent this, the drainage lip 22 having a cut-out 32 in each of the transitional areas 30, as is explained with reference to FIGS. 5 and 6.

FIGS. 5 and 6 show a portion of the dealing profile 9 in a schematic, perspective view and a side view in a transitional area 30. The profiled seal 9 in FIG. 5 is not shown bent or curvilinear, as in the actual installed state. FIG. 6 shows the profiled seal 9 in an unbent state.

The drainage lip 22 has a cut-out 22, that is to say a recess, so that the course of the drainage lip 22 is interrupted. The drainage lip 22 is therefore divided into a rear portion 33 and a front portion 34. The cut-out 32 extends over a predefined length L or portion in the main direction of extent H.

In one exemplary embodiment (not shown) a single cut-out, for example of rectangular shape, is sufficient to produce the aforementioned advantages and functions.

According to FIGS. 5 and 6 a particular shape of cut-out is provided in the exemplary embodiment shown. The cut-out 32 is of trapezoidal design. The cut-out 32 has a rear end area 35 (facing a vehicle rear) and an opposing front end area 36 (facing the front edge portion 7a). In the rear end area 35 the drainage lip 22, that is to say the rear portion 33, has a rear, vertical end edge 37. In the front end area 36 the front portion 34 has a front, vertical end edge 38. Vertical end edge does not necessarily mean that the respective end edge need run perpendicular to the main direction of extent H. Rather, the term includes edges which in the vertical direction project downwards at a specific angle from the first tubular seal 10.

In the front end area 35 the rear vertical edge 37 runs obliquely forwards. In the rear end area 34 the front end edge 38 runs downwards perpendicular to the main direction of extent H, but this is not absolutely essential and other configurations are feasible. The drainage lip 22, that is to say the rear portion 33, thereby projects further forward in the main direction of extent H on the side 39 (underside) of the drainage lip 22 remote from the first tubular seal 10 than on a side 40 (upper side) facing the first tubular seal 10. The rear portion 33 therefore runs to a point (or tapers) on the remote side 39 and forms a tip 41. The rear end edge 37 runs at an acute angle α, for example 45°, to the main direction of extent H and to the remote side 39. The upper longitudinal side 42 (upper longitudinal edge) of the cut-out 32 is longer than the lower longitudinal side 43 (lower longitudinal edge) of the cut-out 32 relative to the main direction of extent H.

Although in the event of an inclination of the vehicle 1, as already mentioned, that is to say inclined forwards, the particular design of the cut-out 32 allows scope for penetrating water 18 to run forwards along the drainage lip 22, that is to say to the rear end area 35 of the cut-out 32 or to the end of the rear portion 33 facing the front of the vehicle, the water 18 would by then at the latest drip off at the tip 41 by virtue of the drainage lip 22 tapering to a point (see arrows and drop in FIG. 5). Owing to the cut-out 32, water cannot reach the front portion 34 of the drainage lip 22. For this purpose, the two end areas 35 are separated by a suitable distance in the direction of main extent H.

LIST OF REFERENCE NUMERALS 1 vehicle
2 vehicle roof
3 roof opening
4 roof element
5 (roof) frame
5a,b frame elements
6 vehicle roof edge
7a,b,c edge portions
8 roof assembly
9 profiled seal
10 first tubular seal
11 second tubular seal
12 connecting web
13 stamped portion
14 adhesively bonded connection
15 recess
16 guide rail
17 top web
18 water
19 water drop
20 wet area
21 dry area
22 drainage lip
23 drive cable channel
24 free end area of the drainage lip
25 tip
26 coupling area
27 notch
28 folding hinge
29 cover undercut
30 transitional area
31 underside
32 cut-out
33 rear portion
34 front portion
35 rear end area
36 front end area
37 rear end edge
38 front end edge
38 remote side
40 facing side
41 tip
42 upper longitudinal side
43 lower longitudinal side
α acute angle
A distance
H main direction of extent
L length
R main direction of extent
S1,S2 planes of section

The invention claimed is:

1. Vehicle roof for a motor vehicle comprising:
a roof opening defined by a peripheral vehicle roof edge,
a moveable roof element for either closing or at least partially exposing the roof opening, which is held on the vehicle roof, and
a continuous profiled seal fixed to the vehicle roof along the vehicle roof edge,
wherein the continuous profiled seal comprises a first tubular seal, wherein the first tubular seal is designed to seal the vehicle roof in relation to the moveable roof element,
the first tubular seal has a drainage lip, which extends downwards in a vertical direction (Z) from the first tubular seal, and
the drainage lip, in a coupling area in which the drainage lip is joined to the first tubular seal, has a notch as part of a folding hinge, the notch and the folding hinge being arranged and formed that, on contact from below by another element, the drainage lip is able to fold in a predefined direction towards a frame or a second tubular seal in a predetermined and desired manner,
the drainage lip has a cut-out in a predefined area of the profiled seal, so that the drainage lip is interrupted in a main direction of extent (H) of the profiled seal along the vehicle roof edge, the cut-out being designed so that water can be purposely drained off at the cut-out.

2. Vehicle roof according to claim 1, wherein the vehicle roof edge comprises at least one longitudinal edge portion running in a vehicle longitudinal direction (X) and one front edge portion running transversely to the vehicle longitudinal direction (X), the profiled seal is arranged along the longitudinal edge portion and the front edge portion, the profiled seal has a curvilinear course in a transitional area between the longitudinal edge portion and the front edge portion, and wherein the cut-out is formed in the transitional area.

3. Vehicle roof according to claim 2, wherein the moveable roof element has a cover undercut which, in a closed state in which the roof element closes the roof opening, engages around the vehicle roof from below at the front edge portion and in so doing bends the drainage lip in the direction of the front edge portion.

4. Vehicle roof according to claim 1, wherein the cut-out is so formed—in relation to the main direction of extent (H) of the profiled seal—that the drainage lip at a rear end area of the cut-out projects further forwards on a side remote from the first tubular seal than on a side facing the first tubular seal.

5. Vehicle roof according to claim 4, wherein the cut-out—in relation to the main direction of extent (H) of the profiled seal—is formed longer on the side facing the first tubular seal than on the side remote from the first tubular seal.

6. Vehicle roof according to claim 4, wherein the drainage lip—in relation the main direction of extent (H)—tapers in the rear end area of the cut-out towards the side remote from the first tubular seal.

7. Vehicle roof according to claim 6, wherein the drainage lip tapers to a point in the rear end area of the cut-out.

8. Vehicle roof according to claim 1, comprising a roof frame, which holds the roof element and which is arranged along the vehicle roof edge of the roof opening, wherein the roof frame along the longitudinal edge portion comprises a longitudinal frame element, which comprises a top web of a guide rail channel, wherein the drainage lip extends along the longitudinal edge portion past the top web to below the top web.

9. Vehicle roof according to claim 1, wherein the continuous profiled seal comprises the second tubular seal which is connected to the first tubular seal, wherein the second tubular seal is designed to seal a roof frame in relation to the vehicle roof.

10. Roof assembly for a vehicle roof of a motor vehicle,
wherein the vehicle roof has a roof opening defined by a peripheral vehicle roof edge, the roof assembly comprising:
a moveable roof element for either closing or at least partially exposing the roof opening, which can be arranged on the vehicle roof, and
a continuous profiled seal that can be fixed to the vehicle roof along the vehicle roof edge, wherein the continuous profiled seal comprises a first tubular seal, wherein the first tubular seal is designed to seal the vehicle roof in relation to the moveable roof element,
the first tubular seal has a drainage lip, which extends downwards in a vertical direction (Z) from the first tubular seal, and
the drainage lip, in a coupling area in which the drainage lip is joined to the first tubular seal, has a notch as part of a folding hinge, the notch and the folding hinge being arranged and formed that, on contact from below by another element, the drainage lip is able to fold in a predefined direction towards a frame or a second tubular seal in a predetermined and desired manner,
the drainage lip has a cut-out in a predefined area of the profiled seal, so that the drainage lip is interrupted in a main direction of extent (H) of the profiled seal along the vehicle roof edge, the cut-out being designed so that water can be purposely drained off at the cut-out.

* * * * *